(No Model.)

W. L. CLARK.
NUT LOCK.

No. 548,151.                                   Patented Oct. 15, 1895.

Witnesses:
E. R. Shipley.
C. M. Shinham

Walter L. Clark
Inventor
by James W. See
Attorney

United States Patent Office.

WALTER L. CLARK, OF NEW YORK, N. Y., ASSIGNOR TO THE VIBRATION-PROOF NUT COMPANY, OF NEW YORK.

NUT-LOCK.

SPECIFICATION forming part of Letters Patent No. 548,151, dated October 15, 1895.

Application filed March 16, 1895. Serial No. 541,963. (No model.)

*To all whom it may concern:*

Be it known that I, WALTER L. CLARK, of New York, New York county, New York, have invented certain new and useful Improvements in Nut-Locks, of which the following is a specification.

This invention pertains to nut-locks for preventing the rattling loose of nuts upon their bolts; and the invention will be readily understood from the following description, taken in connection with the accompanying drawings, in which—

Figure 1:
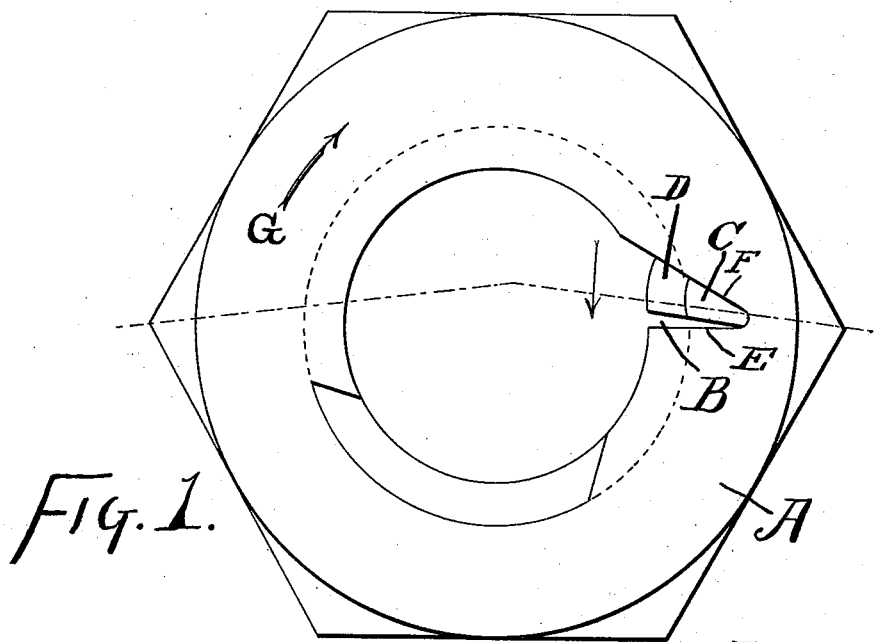
Figure 2:
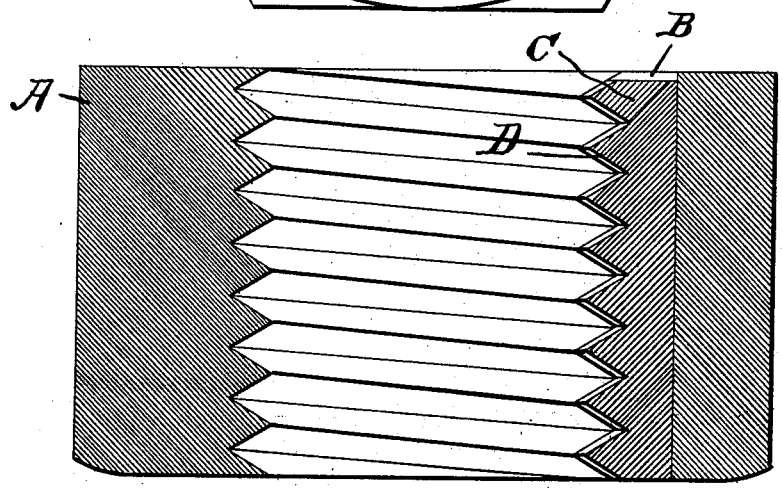

Figure 1 is a face view of a nut having a nut-lock exemplifying my improvement, and Fig. 2 is a diametrical section of the same.

In the drawings, A indicates the body of the nut of ordinary form; B, a gap in the inner wall of the nut extending entirely through the nut and having a depth considerably greater than that of the threads of the nut, the walls of the gap converging outwardly and joining to form a narrow concave seat parallel with the axis of the nut; C, a block seated in the gap of the nut and tapering radially and having its thin outer edge convex and seating in the outer extremity of the gap, the thickness of the block being such that it is free to vibrate in the gap upon its outer extremity as a pivot, the inner surface of the block being substantially in the plane of the periphery of the inner circle of the threads of the nut; D, notches across the inner face of the block corresponding with the threads of the nut; E, one wall of the gap or notch; F, the other wall of the gap or notch, and G an arrow indicating the direction of rotation of the nut in applying it to its screw.

The notches or threads D upon the block are cam-shaped with reference to the heel of the block where it bears in the notch. If the nut be turned in the direction of the arrow G, the block will bear against wall F and the nut will screw upon its bolt, the block forming in effect a segment of the nut corresponding with the rest of the threading of the nut. Now the nut having been screwed upon the bolt, if an attempt be made to turn the nut in the reverse direction the friction of the bolt-threads upon the threaded portion of the block will urge the inner portion of the block away from wall F and toward wall E, and when this occurs the block acts cam-like upon the threads of the bolt and pinches upon the bolt, the block thus becoming in effect a friction cam-pawl which will prevent the unscrewing of the nut. The greater the force applied to unscrew the nut the more powerful becomes the pinching of the block upon the bolt, and the bolt may be twisted off or the nut burst without effecting the unscrewing of the nut from the bolt. In the cam-and-pawl action of the block as it frictionally bites upon the bolt the compressive action of the block upon the bolt is both inwardly upon the bolt and sidewise upon the threads of the screw of the bolt. If it be desired to unscrew the nut from the bolt, then the block is to be prevented from going to locking position, which may be done by inserting a proper tool or any bit of wire or the like temporarily in the notch between the block and wall E, which has the effect of holding the block in the position it occupies when the nut is to be screwed upon the bolt.

I claim as my invention—

In a nut lock, the combination, substantially as set forth, of a threaded nut having a gap formed in its inner wall and extending lengthwise through the nut and having its extremity of depth forming a concave seat, and a tapering block seated in said gap and having its outer extremity made convex and seating in said concave seat, said block being thinner than said gap and having its inner face notched in correspondence with the threads of the nut and cam-shaped with relation to the convex heel of the block.

WALTER L. CLARK.

Witnesses:
LLEWELLA M. CLARK,
EDITH F. SAMPSON.